April 10, 1962 W. WANIELISTA ETAL 3,028,786
VACUUM FRAME FOR USE IN MAKING COLOR SEPARATIONS
Filed Feb. 4, 1959 2 Sheets-Sheet 1

Inventors
Walter Wanielista
Daniel Franklin Keller

By Attys

April 10, 1962 W. WANIELISTA ETAL 3,028,786
VACUUM FRAME FOR USE IN MAKING COLOR SEPARATIONS
Filed Feb. 4, 1959 2 Sheets-Sheet 2

Inventors
Walter Wanielista
Daniel Franklin Keller

United States Patent Office

3,028,786
VACUUM FRAME FOR USE IN MAKING COLOR SEPARATIONS
Walter Wanielista, Westchester, and Daniel Franklin Keller, Kenilworth, Ill., assignors to Robertson Photo-Mechanix, Inc., Chicago, Ill., a corporation of Illinois
Filed Feb. 4, 1959, Ser. No. 791,115
8 Claims. (Cl. 88—24)

This invention relates generally to photographic processes and apparatus and more specifically relates to a method of making color separations with the use of a vacuum frame wherein first sheet form members such as transparencies or separation negatives are pin-registered and vacuum-biased in fixed position in a selected plane of a camera lens system and second sheet form member such as masks or halftone screens are temporarily pin-registered and vacuum-biased in overlying relation thereto so that the second sheet form members can be changed without disturbing the first sheet form member.

In structural terms, the invention relates specifically to a vacuum frame comprising a rigid frame having a glass insert and formed with inner and outer vacuum channels as well as first and second pin registration means, the vacuum channels being regulated by a selector means so that transparencies, separation negatives, halftone screens and masks may be selectively paired in prealigned fixed position at the focal plane or copyboard position of a camera lens system.

An object of the invention is to provide an improved vacuum frame.

It is an object of the present invention to provide improved processes and apparatus for making color separations.

Another object of the present invention is to provide improved camera equipment for handling thin stable films.

Yet another object of the present invention is to provide vacuum frames which can be effectively used with existing three-point register systems for a masking technique in preparing color separations.

Another object of the present invention is to provide improved vacuum frames which permit a pin-register system to be employed through an entire color separation operation.

Many other features, advantages and additional objects of the present invention will become manifest to those versed in the art upon making reference to the detailed description which follows and the accompanying sheets of drawings in which a preferred structural embodiment of the improved photographic apparatus of the present invention is shown by way of illustrative example. It is believed that the processes contemplated by the present invention will become clear to those versed in the art from the detailed description of the apparatus disclosed herein.

Figure 1:
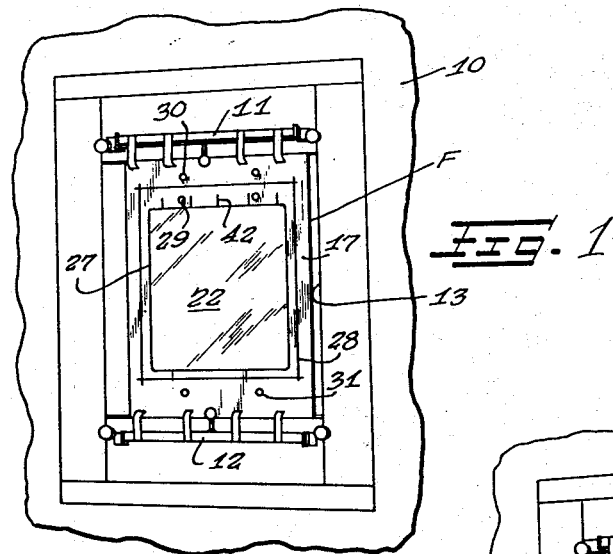
FIGURE 1 is fragmentary view showing a portion of a graphic arts camera and illustrating a vacuum and illustrating a vacuum frame provided in accordance with the principles of the present invention in copyboard position.

In the past, the color photographer has been restricted by the inflexibility of the color separation systems and materials available to him. The extensive use of magenta masking techniques has resulted in tying up expensive camera equipment for long periods of time. Moreover, the practice of such prior art techniques makes it practically impossible to exercise judgment as to how much or how little correction was being made until the expensive and time-consuming job was completed.

With other masking systems, glass sandwiches became far too thick and registration was difficult because of the refraction and internal reflection of light as it passed through the various layers of glass plates. If film was used in conjunction with glass to reduce the thickness, registration became a problem. Because of the mechanical difficulty so often encountered, masking as a method of color correction has fallen into disrepute with some artisans.

The development of contemporary polyester graphic arts film having improved stability and thinness has indicated the desirability of pin-register masking systems of preparing color separations. In such procedures, graphic arts cameras are used for making continuous tone positives where the subject is enlarged or reduced to final size and the image can be laterally reversed.

It is contemplated by the present invention that corrected masked negatives be placed in a vacuum holder incorporating the principles of the present invention whereby the negatives may be positioned into the precision plate holder in the copyboard. Moreover, the vacuum frame holder thus provided can be employed to correctly prealign under vacuum bias additional sheet form members such as masks or screen half-tones in overlying relation to a transparency or separation negative.

In order to convert existing camera equipment utilizing a three-point register system, it is contemplated by the present invention to provide a set of vacuum frames according to the present invention which have similar structural characteristics but which differ in the type of glass used.

One of the frames provided in accordance with the principles of the present invention is equipped with a ground glass for use at the focal plane and acts with a twofold purpose. The frame constitutes the vacuum back and holds the film in the focal plane and can also be used for focusing in position.

The second vacuum frame is equipped with a clear plate of glass and is used at the copyboard position to hold the transparency and masks or the separate negatives and masks. Thus, as shown in FIGURES 1 and 2 the frame in the copyboard position would comprise a device supplied with a clear plate of glass, whereas in the device shown in FIGURE 3 in the focal plane of the camera lens system, a ground glass plate would be employed.

Since the structural characteristics of both types of vacuum frames are identical, a single set of reference numerals will be employed in describing the same herein.

Figure 2:
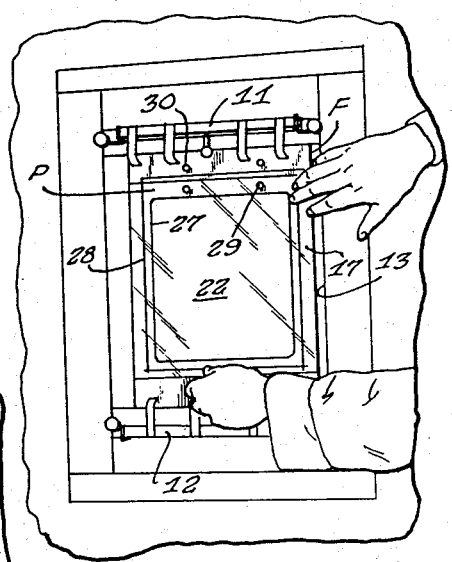
FIGURE 2 is a view similar to FIGURE 1 but showing a photographic sheet form member being placed on the vacuum frame with the assistance of pin-registration means incorporated into the vacuum board of the present invention.
Figure 3:
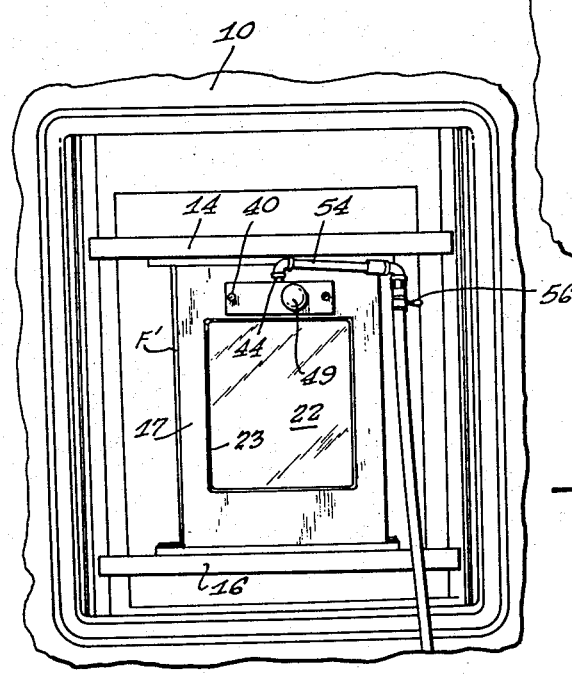
FIGURE 3 is a view illustrating the reverse side of the vacuum frame of FIGURES 1 and 2 and shows the vacuum frame of the present invention mounted in a glass plate holder at the focal plane of a graphic arts camera.
Figure 4:
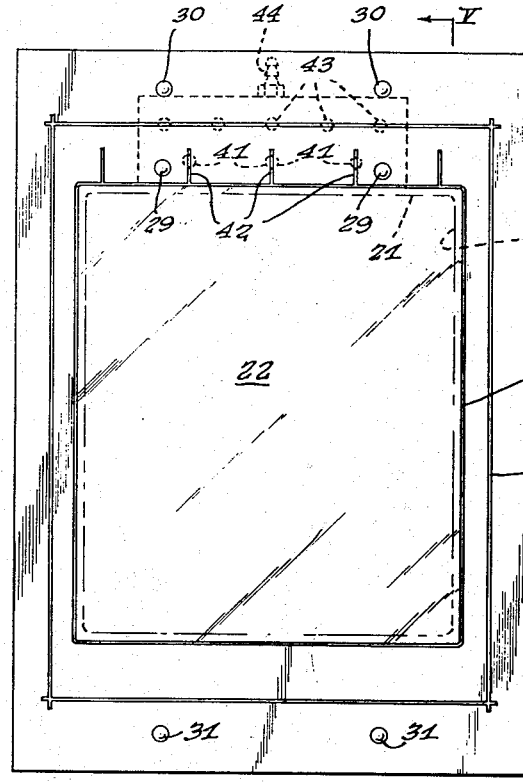
FIGURE 4 is an elevational view of the vacuum frame illustrated in FIGURES 1–3.
Figure 5:
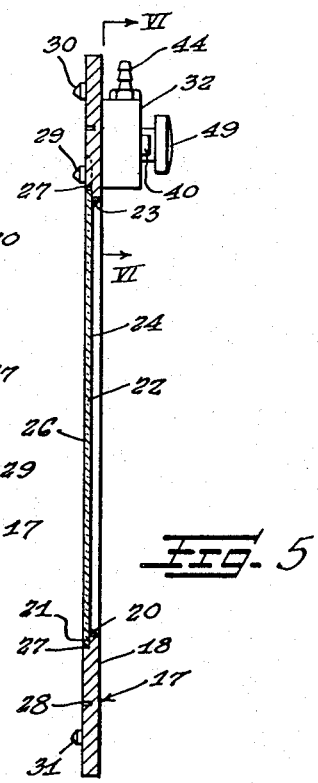
FIGURE 5 is a cross-sectional view with parts shown in elevation taken substantially on line V—V of FIGURE 4.

As shown in FIGURES 1 and 2, a graphic arts camera is shown fragmentarily at 10 and includes suitable upper retainer means 11 and lower retainer means 12 for positioning a vacuum frame indicated generally at F in an opening 13 at the copyboard position of the camera. As indicated in FIGURE 3, the graphic arts camera 10 has upper retainer means 14 and lower retainer means 16 for positioning a vacuum frame F' in the focal plane of the camera lens system.

For a proper understanding of the structural and functional characteristics of each of the frames F and F', reference is made to the detailed views of FIGURES 4–7.

A rigid generally rectangular metal frame is shown at 17 and comprises a back face 18 and a front face 19, the center portion of which having formed therein a generally rectangular opening 20.

The opening 20 is, in effect, flanged by virtue of the provision of a peripheral notch 21 extending completely around the periphery of the opening 20 and formed as a milled recess of sufficient depth to receive and seat a glass plate 22 in the opening 20, together with a paper gasket and suitable adhesive indicated at 23. Thus, one face of the glass plate 22 shown at 24 is positioned in register with the opening 20 but is spaced from the back face 18, whereas the opposite face 26 of the glass plate 22 is disposed in co-planar relation with the front face 19 of the rigid frame 17.

The peripheral edges of the glass plate 22 are swiped or otherwise relieved thereby to form with the adjoining wall portions of the rigid frame 17 in the recess 21 a rectangular vacuum channel 27.

Spaced outwardly of the vacuum channel 27, the frame 17 is provided wtih a second vacuum channel indicated at 28. The vacuum channel 28 is formed by a pattern of rectangularly arranged slots each of which slightly overruns the intersecting slot at the corner thereby to form a peripherally continuous vacuum slot 28 which is inwardly of the outer edge of the frame 17 but outwardly of the vacuum channel 27.

The face 19 of the frame 17 is further characterized by the provision of register pin means. A first pair of register pins is indicated at 29, 29 spaced adjacent the vacuum channel 27 along the upper edge thereof. The register pins 29, 29 are adapted to prealign a first sheet form member such as a color transparency or a separation negative.

The frame 17 at the face 19 is further characterized by a second register pin means shown as including either or both a second pair of register pins 30, 30 or 31, 31 It will be noted that the register pins 30, 30 and 31, 31 are positioned outwardly of the vacuum channels 28, the pins 30, 30 being located along the upper margin of the frame 17 and the pins 31, 31 being disposed along the lower margin of the frame 17. Thus, the register pins 30, 30 and 31, 31 are adapted to prealign a second sheet form member such as a mask or a screen half-tone member in overlying relation to the first sheet form member.

Figure 6:
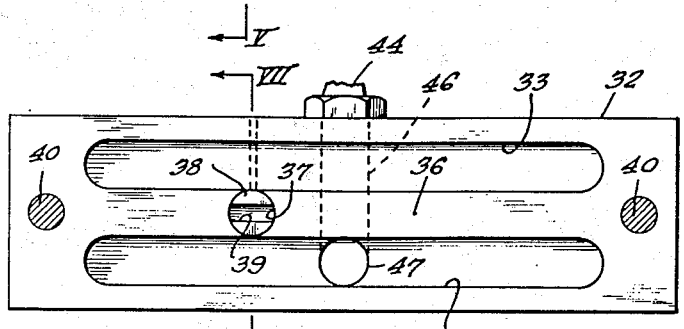
FIGURE 6 is a fragmentary enlarged view taken substantially on line VI—VI of FIGURE 5.
Figure 7:
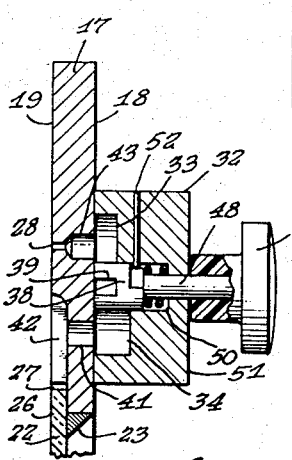
FIGURE 7 is a fragmentary cross-sectional view with parts shown in elevation taken substantially on line VII—VII of FIGURE 6.

Along the upper portion of the frame 17 and on the back face 18, there is mounted a valve body 32 forming a manifold. As illustrated in FIGURE 6, the manifold comprises a laterally extending slot 33 and a laterally extending slot 34 separated by a wall 36 having a passage 37 formed therein which is circular in configuration and which receives a correspondingly circularized valve plug shown at 38. The valve plug 38 is formed with a slot 39 which extends completely across in diametral direction and which is selectively positioned to completely close the passage 37 between the slots 33 and 34 or to place the slots 33 and 34 in intercommunicating relation.

The valve body 32 is held in firm assembly with the frame 17 by suitable fastening means indicated at 40 (FIGURE 6). A plurality of openings 41 are formed in the frame and extend from the back face 18 toward the front face 19, each respective opening 41 intersecting a slot 42 which, in turn, intersects one leg of the vacuum channel 27, thereby to intercommunicate the vacuum channel 27 with the manifold slot 34.

In like manner, the frame 17 is characterized by the provision of a plurality of openings 43 which extend from the back face 18 to intersect the vacuum channel 28 at one leg thereof, thereby intercommunicating the vacuum channel 28 with the manifold slot 33.

The valve body 32 is provided with a hose nipple 44 adapted to be connected to a vacuum pump or suitable source of reduced pressure, the hose nipple being connected to the valve body 32 at a suitable passage indicated at 46 and communicating with the manifold slot 34 at the opening 47.

The valve plug 38 is provided with a shaft extension 48 which extends outwardly of the valve body 32 and has connected thereto a manual knob 49. A recess 50 is formed in the valve body 32 and bottoms a coil spring 51 which preloads the valve plug 38 sufficiently to keep the valve plug 38 in selected adjusted position. A retainer pin 52 in the valve body 32 cooperates with a notched recess in the valve plug to keep the valve plug 38 in properly aligned axial position.

In operation, the clear glass form of vacuum frame F is used at the copyboard position in a graphic arts camera, as shown in FIGURES 1 and 2, and the ground glass form of vacuum frame F' is used at the focal plane of the graphic arts camera 10, as shown in FIGURE 3. In any event, the hose nipple 44 is connected to a suitable conduit as indicated at 54 on FIGURE 3, which conduit may be provided with a shut-off valve 56 and attached in operative relation to a vacuum pump on the camera 10 (not shown).

In FIGURE 2 the use of the vacuum frame F is specifically illustrated since a positive P is being placed on the register pins 29. It will be understood that the glass plate 22, together with the surface 19 of the frame 17 forms a vacuum back on which sheet form members are readily supported. Thus, the clear holder or vacuum frame F is used at the copyboard position and will hold the transparency and masks, or the separation negatives and masks, while the ground glass holder or vacuum frame F' may be advantageously used at the focal plane to hold the film in the focal plane and can also be used for focusing and positioning.

A set of vacuum frames F and F', therefore, conveniently function as conversion equipment for camera apparatus presently in existence and utilizing a three-point register system.

Since the vacuum back or working surface provided by the glass plate 22 and the surface 19 of the frame 17 is particularly characterized by the two-zone vacuum biasing means provided by the inner and outer vacuum channels 27 and 28, different sheet form members are permitted to be held firmly in place on the same frame. Moreover, by combining such two-zone arrangement with a selector means such as the regulator valve, the vacuum bias exerted by the inner vacuum channel 27 can be maintained continuously while the vacuum bias of the outer vacuum channel 28 is intermittently applied, thereby to permit changing of one of the sheet form members without disturbing the other. Furthermore, the pin register means 29, 30 and 31 constituting a functionally integral part of the frame 17 insure accurate precision prealignment which makes it possible to apply a pin-register system through the entire color separation operation from the first negative straight through to the engraving.

Although minor modifications might be suggested by those versed in the art, it should be understood that we wish to embody within the scope of the patent warranted hereon all such modifications as reasonably and properly come within the scope of our contribution to the art.

We claim as our invention:

1. A vacuum frame comprising a rigid frame having a planar back surface. said frame having a flanged inner opening formed therein, a glass plate supported in said flanged opening and having a flat surface disposed in coplanar relation with said planar back surface of said frame, said glass plate having swiped edges to form an inner vacuum channel opening into said planar back surface, said frame having an outer vacuum channel formed therein spaced outwardly of said inner vacuum channel, and pin means on said frame projecting outwardly of said surface, whereby first and second sheets may be separately prealigned and vacuum-biased on said planar back in register with said glass plate.

2. A vacuum frame as defined in claim 1, a valve body on said frame having a distributing manifold communicating with said inner and outer vacuum channels and a selector valve in said valve body regulating the flow of fluid from a vacuum source to said vacuum manifold for selectively applying a vacuum bias to said inner and outer vacuum channels.

3. A vacuum frame comprising a rigid frame having a planar back surface, said frame having a flanged inner opening formed therein, a glass plate supported in said flanged opening and having a flat surface disposed in coplanar relation with said planar back surface of said frame, said glass plate having swiped edges to form an inner vacuum channel opening into said planar back surface, said frame having an outer vacuum channel formed therein spaced outwardly of said inner vacuum channel, and pin means on said frame projecting outwardly of said surface, said pin means comprising a first pin means inwardly of said outer vacuum channel and a second pin means outwardly of said outer vacuum channel, whereby first and second sheets may be separately prealigned and vacuum-biased on said planar back in register with said glass plate.

4. A vacuum frame comprising a rigid frame having a planar back surface, said frame having a flanged inner opening formed therein, a glass plate supported in said flanged opening and having a flat surface disposed in coplanar relation with said planar back surface of said frame, said glass plate having swiped edges to form an inner vacuum channel opening into said planar back surface, said frame having an outer vacuum channel formed therein spaced outwardly of said inner vacuum channel, pin means on said frame projecting outwardly of said surface, and means for applying continuous vacuum bias to said inner vacuum channel and temporary vacuum bias to said outer vacuum channel, whereby first and second sheets may be separately prealigned and vacuum-biased on said planar back in register with said glass plate.

5. In combination, a vacuum frame comprising a rigid frame having a planar back surface, said frame having a flanged inner opening formed therein, a glass plate supported in said flanged opening and having a flat surface disposed in coplanar relation with said planar back surface of said frame, said glass plate having swiped edges to form an inner vacuum channel opening into said planar back surface, said frame having an outer vacuum channel formed therein spaced outwardly of said inner vacuum channel, pin means on said frame projecting outwardly of said surface, and a selector regulator connected to a source of vacuum and being in control of said inner and outer vacuum channels to temporarily release the vacuum bias on said outer channel while continuing the vacuum bias on said inner channel, whereby first and second sheets may be separately prealigned and vacuum-biased on said planar back in register with said glass plate.

6. In combination with a camera including a lens system and a copyboard, a vacuum frame comprising a rigid frame having a planar back surface, said frame having a flanged inner opening formed therein, a glass plate supported in said flanged opening and having a flat surface disposed in coplanar relation with said planar back surface of said frame, said glass plate having swiped edges to form an inner vacuum channel opening into said planar back surface, said frame having an outer vacuum channel formed therein spaced outwardly of said inner vacuum channel, and pin means on said frame projecting outwardly of said surface, whereby first and second sheets may be separately prealigned and vacuum-biased on said planar back in register with said glass plate.

7. In the combination of claim 6, said glass plate comprising a ground glass for use of said vacuum frame at a focal plane of the camera in focusing and positioning.

8. In the combination of claim 6, said glass plate comprising a clear glas material for use of the vacuum frame at the copyboard position of the camera in holding transparencies and masks or separation negatives and masks on said pin means in register with said glass plate.

References Cited in the file of this patent

UNITED STATES PATENTS

| | | |
|---|---|---|
| 2,317,348 | Wekeman | Apr. 27, 1943 |
| 2,741,963 | Anander | Apr. 17, 1956 |
| 2,799,204 | Blatherwick | July 16, 1957 |
| 2,814,233 | Anander | Nov. 26, 1957 |
| 2,814,975 | Mears | Dec. 3, 1957 |
| 2,952,185 | Palmer et al. | Sept. 13, 1960 |